United States Patent
Li

(10) Patent No.: US 12,375,202 B2
(45) Date of Patent: Jul. 29, 2025

(54) DATA TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Haitao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 452 days.

(21) Appl. No.: 17/884,331

(22) Filed: Aug. 9, 2022

(65) Prior Publication Data

US 2022/0385393 A1 Dec. 1, 2022

Related U.S. Application Data

(63) Continuation of application No. PCT/CN2020/075820, filed on Feb. 19, 2020.

(51) Int. Cl.
H04L 1/00 (2006.01)
H04W 24/10 (2009.01)

(52) U.S. Cl.
CPC .......... *H04L 1/0003* (2013.01); *H04L 1/0009* (2013.01); *H04W 24/10* (2013.01)

(58) Field of Classification Search
CPC ... H04L 1/0003; H04L 1/0009; H04L 1/0015; H04L 1/0026; H04L 1/0016; H04W 24/10
USPC ....................................................... 370/329
See application file for complete search history.

(56) References Cited

U.S. PATENT DOCUMENTS

| | | | |
|---|---|---|---|
| 2003/0126536 A1* | 7/2003 | Gollamudi ............ | H04L 1/0016 714/748 |
| 2007/0133480 A1* | 6/2007 | Nam ..................... | H04L 1/0003 370/335 |
| 2007/0183529 A1* | 8/2007 | Tujkovic .............. | H04B 7/0413 375/267 |
| 2012/0063408 A1* | 3/2012 | Chun ................... | H04L 1/0025 370/329 |
| 2013/0215985 A1* | 8/2013 | Lee ..................... | H04L 27/2647 370/335 |

(Continued)

FOREIGN PATENT DOCUMENTS

| | | |
|---|---|---|
| CN | 110213792 A | 9/2019 |
| EP | 3522647 A1 | 8/2019 |

OTHER PUBLICATIONS

SAMSUNG. "Physical layer control procedures in NTN", 3GPP TSG RAN WG1 Meeting #99 R1-1912469, Nov. 22, 2019 (Nov. 22, 2019), sections 1-2.

(Continued)

*Primary Examiner* — Jungwon Chang
(74) *Attorney, Agent, or Firm* — Ladas & Parry LLP

(57) ABSTRACT

A data transmission method, a terminal device, a network device are provided. In the method, a terminal device performs uplink transmission by using a first Modulation and Coding Scheme (MCS) level, wherein the first MCS level is one of the MCS levels determined from N MCS levels according to measurement related information of a service cell of the terminal device, and N is an integer greater than or equal to 2.

20 Claims, 4 Drawing Sheets

The terminal device receives the configuration information sent by the network device — 41

The terminal device performs serving cell measurement — 42

The terminal device determines to use the MCS level corresponding to the measurement result interval where the terminal device is located to perform uplink transmission according to a mapping relationship from the current serving cell measurement result and the network configured measurement result interval to the MCS level — 43

(56) References Cited

U.S. PATENT DOCUMENTS

| | | | |
|---|---|---|---|
| 2016/0057647 A1* | 2/2016 | Sullivan | H04L 1/0016 |
| | | | 370/253 |
| 2019/0246420 A1 | 8/2019 | Park et al. | |
| 2020/0187248 A1* | 6/2020 | Lee | H04J 11/0026 |
| 2022/0173856 A1* | 6/2022 | Ko | H04L 5/0053 |

OTHER PUBLICATIONS

Nokia et al. "Considerations on Physical Layer Control Procedure in NTN", 3GPP TSG RAN WG1 #99 R1-1913016, Nov. 22, 2019 (Nov. 22, 2019), sections 1-3.
International Search Report in the international application No. PCT/CN2020/075820, mailed on Oct. 27, 2020.
Written Opinion of the International Search Authority in the international application No. PCT/CN2020/075820, mailed on Oct. 27, 2020.
Sony: "Discussion on physical layer control procedures", 3GPP Draft; R1-1912347, 3rd Generation Partnershipproject (3GPP), Mobile Competence Centre ; 650, Route Des Lucioles ; F-06921 Sophia-Antipolis Cedex; France, vol. RAN WG1, no. Reno, USA; Nov. 18, 2019-Nov. 22, 2019 Nov. 9, 2019 (Nov. 9, 2019), XP051823364.
GATT: "Physical layer control procedure enhancement", 3GPP Draft: R1-1910337, 3rd Generation Partnershipproject (3GPP), Mobile Competence Centre ; 650, Route Deslucioles ; F-06921 Sophia-Antipolis Cedex; France, vol. RAN WG1, no. Chongqing, China: Oct. 14, 2019-Oct. 20, 2019 Oct. 5, 2019 (Oct. 5, 2019), XP051808518.
Supplementary European Search Report in the European application No. 20920323.1, mailed on Jan. 3, 2023.

* cited by examiner

DATA TRANSMISSION METHOD, TERMINAL DEVICE AND NETWORK DEVICE

CROSS-REFERENCE TO RELATED APPLICATIONS

This application is a continuation of International Patent Application No. PCT/CN2020/075820 filed on Feb. 19, 2020, disclosure of which is hereby incorporated by reference in its entirety.

BACKGROUND

In a related art, in order to better serve periodic services, the concept of pre-configured resources is introduced. Downlink is called Semi-Persistent Scheduling (SPS), and uplink is called Configured Grant (CG). NR supports the transmission of the following two types of uplink CG: Physical Uplink Shared Channel (PUSCH) transmission based on CG type 1 and PUSCH transmission based on CG type 2. Compared with a cellular network used by traditional New Radio (NR), a signal propagation delay between a terminal device and a satellite in Non Terrestrial Network (NTN) is greatly increased. Large propagation delay will introduce very large scheduling delay for scheduling transmission, which results in large service transmission delay. Therefore, an NTN scenario is not very suitable for the scenario of scheduling transmission. The PUSCH adopting CG type 1 can reduce the transmission delay. However, this will maximize the use of a channel, so that the transmission of more service data cannot be guaranteed.

SUMMARY

The disclosure relates to the field of communication, and in particular, to a data transmission method, a terminal device, a network device, a chip, a computer-readable storage medium.

A first aspect provides a data transmission method, which includes the following operation.

A terminal device performs uplink transmission by using a first Modulation and Coding Scheme (MCS) level.

The first MCS level is one of MCS levels determined from N MCS levels according to the measurement related information of the serving cell of the terminal device, and N is an integer greater than or equal to 2.

A second aspect provides a data transmission method, which includes the following operation.

A network device receives uplink transmission transmitted by using a first MCS level.

The first MCS level is one of N MCS levels, and N is an integer greater than or equal to 2.

A third aspect provides a terminal device, which includes a first communication unit.

The first communication unit is configured to perform uplink transmission by using a first MCS level.

The first MCS level is one of MCS levels determined from N MCS levels according to the measurement related information of the serving cell of the terminal device, and N is an integer greater than or equal to 2.

A fourth aspect provides a network device, which includes a second communication unit.

The second communication unit is configured to receive the uplink transmission transmitted by using a first MCS level.

The first MCS level is one of N MCS levels, and N is an integer greater than or equal to 2.

A fifth aspect provides a terminal device, which includes a processor and a memory configured to store a computer program that can run on the processor.

The memory is configured to store the computer program, and the processor is configured to call and run the computer program stored in the memory to execute steps in the abovementioned method.

A sixth aspect provides a network device, which includes a processor and a memory configured to store a computer program that can run on the processor.

The memory is configured to store the computer program, and the processor is configured to call and run the computer program stored in the memory to execute steps in the abovementioned method.

A seventh aspect provides a chip, which includes a processor, configured to call and run a computer program in a memory to enable a device installed with the chip to execute the abovementioned method.

An eighth aspect provides a computer-readable storage medium. The computer-readable storage medium is configured to store a computer program, and the computer program enables a computer to execute steps of the abovementioned method.

A ninth aspect provides a computer program product, which includes a computer program instruction, and the computer program instruction enables a computer to execute the abovementioned method.

A tenth aspect provides a computer program, and the computer program enables the computer to execute the abovementioned method.

BRIEF DESCRIPTION OF THE DRAWINGS

FIG. 2 is a first schematic flowchart of a data transmission method provided by an embodiment of the disclosure.

FIG. 3 is a second schematic flowchart of a data transmission method provided by an embodiment of the disclosure.

DETAILED DESCRIPTION

In order to provide a more detailed understanding of the features and technical aspects of the embodiments of the disclosure, the implementation of the embodiments of the disclosure will be described in detail below with reference to the accompanying drawings, and the accompanying drawings are for illustrative purposes only and are not intended to limit the embodiments of the disclosure.

The technical solutions in the embodiments of the application are described below with reference to the accompanying drawings in the embodiments of the application. It is apparent that the described embodiments are part rather than all embodiments of the application. All other embodiments obtained by those of ordinary skill in the art based on the embodiments of the application without creative efforts shall fall within the scope of protection of the application.

The technical schemes of the embodiments of the disclosure may be applied to various communications systems, such as a Global System for Mobile Communications (GSM), a Code Division Multiple Access (CDMA) system, a Wideband Code Division Multiple Access (WCDMA) system, a General Packet Radio Service (GPRS) system, a General Packet Radio Service (GPRS), a Long Term Evolution (LTE) system, a Frequency Division Duplex (FDD) system, a Time Division Duplex (TDD) system, a Universal Mobile Telecommunications System (UMTS), a Universal Mobile Telecommunication System (UMTS), a Worldwide Interoperability for Microwave Access (WiMAX) communications system, or a 5G system.

Figure 1:
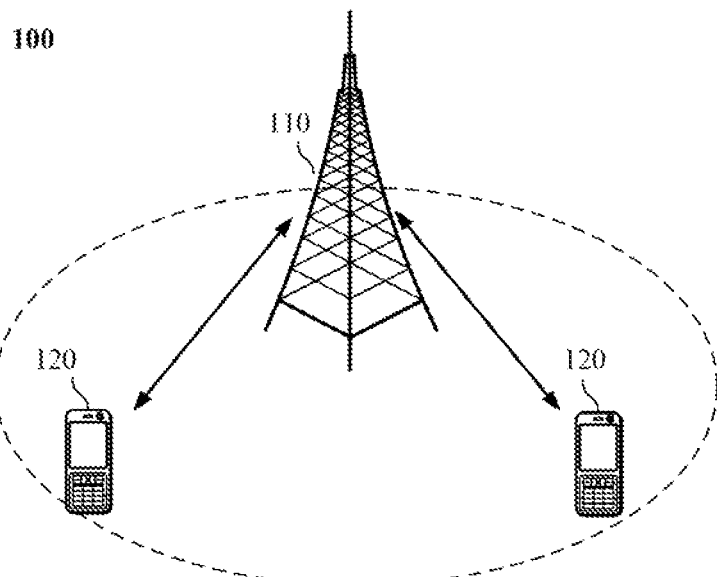
FIG. 1 is a first schematic diagram of a communication system architecture provided by an embodiment of the disclosure.

Exemplarily, a communication system 100 applied in an embodiment of the disclosure may be as shown in FIG. 1. The communication system 100 may include a network device 110. The network device 110 may be a device in communication with User Equipment (UE) 120 (or called a communication terminal device or a terminal device). The network device 110 may provide communication coverage for a specific geographical area, and may communicate with the UE located within the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a mobile switching center, a relay station, an access point, an on-board device, a wearable device, a hub, a switch, a network bridge, a router, a network-side device in a future 5G network, a network device in a future evolved Public Land Mobile Network (PLMN) or the like.

The communication system 100 further includes at least one UE 120 located within the coverage of the network device 110. A "UE" used herein includes, but not is limited to, an apparatus arranged to receive/send a communication signal through a wired line connection, for example, through Public Switched Telephone Network (PSTN), Digital Subscriber Line (DSL), digital cable and direct cable connections, and/or another data connection/network) and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another UE, and/or an Internet of Things (IoT) device. The UE arranged to communicate through a wireless interface may be called a "wireless communication terminal", a "wireless terminal device" or a "mobile terminal device".

It should be understood that the terms "system" and "network" herein are often used interchangeably herein. The term "and/or" in this specification describes only an association relationship for describing associated objects and represents that three relationships may exist. For example, A and/or B may represent the following three cases: Only A exists, both A and B exist, and only B exists. In addition, the character "/" herein generally indicates that the contextual objects are in an "or" relationship.

In order to provide a more detailed understanding of the features and technical aspects of the embodiments of the disclosure, the implementation of the embodiments of the disclosure will be described in detail below with reference to the accompanying drawings, and the accompanying drawings are for illustrative purposes only and are not intended to limit the embodiments of the disclosure.

An embodiment of the disclosure provides a data transmission method, as shown in FIG. 2, including the following step.

At S21: a terminal device performs uplink transmission by using a first MCS level.

The first MCS level is one of MCS levels determined from N MCS levels according to the measurement related information of the serving cell of the terminal device, and N is an integer greater than or equal to 2.

Correspondingly, an embodiment of the disclosure further provides a data transmission method, as shown in FIG. 3, including the following step.

At S31: a network device receives uplink transmission transmitted by using a first MCS level.

The first MCS level is one of N MCS levels, and N is an integer greater than or equal to 2.

In the embodiment, the uplink transmission is transmission performed on CG resources. The network device may be a satellite in an NTN scenario.

The embodiment provided by the application may be applied to an NTN. The NTN provides a communication service for ground users in a satellite communication mode. Compared with terrestrial cellular network communication, satellite communication has many unique advantages. Firstly, the satellite communication is not limited by the terrain of users. For example, general terrestrial communication cannot cover the areas, where a network device cannot be set up or the communication coverage cannot be made due to the scarcity of population, such as oceans, mountains, and deserts. For the satellite communication, since one satellite can cover large ground and the satellite can perform orbital motion around the earth, theoretically every corner on the earth can be covered by the satellite communication. Secondly, the satellite communication has great social value. The satellite communication can cover remote mountainous areas and poor and backward countries or regions with low cost, so that people in these regions can enjoy advanced voice communication and mobile Internet technology, which is conducive to narrowing the digital divide with developed regions and promoting the development of these regions. Thirdly, the distance of the satellite communication is long, and the cost of communication does not increase significantly with the increase of communication distance. Finally, the satellite communication has high stability and is not limited by natural disasters.

Communication satellites are divided into Low Earth Orbit (LEO) satellites, Medium Earth Orbit (MEO) satellites, Geostationary Earth Orbit (GEO) satellites, High Elliptical Orbit (HEO) satellites, etc. according to different orbital heights.

The LEO has the height range of 500 km to 1500 km, and the corresponding orbital period of about 1.5 hours to 2 hours. The single propagation delay of single hop communication between users is generally less than 20 ms. The maximum satellite viewing time is 20 minutes. The signal propagation distance is short, the link loss is small, and the requirement on the transmission power of a user terminal is not high.

The GEO has the orbital height of 35786 km and a rotation period of 24 hours around the earth. The single propagation delay of the single hop communication between the users is generally is 250 ms.

In order to ensure the coverage of a satellite and improve the system capacity of the whole satellite communication system, the satellite covers the ground by using a plurality of beams. One satellite can form dozens or even hundreds of beams to cover the ground. The beams of one satellite can cover a ground area with a diameter of tens to hundreds of kilometers.

In order to better serve periodic services, the concept of pre-configured resources is introduced. Downlink is called SPS, and uplink is called CG.

NR supports the transmission of the following two types of uplink CG:

PUSCH transmission based on CG type 1: a network Radio Resource Control (RRC) configures all transmission resources and transmission parameters, including time domain resources, frequency domain resources, a period of the time domain resources, an MCS, times of repetition, frequency hopping, and the number of Hybrid Automatic Repeat Quest (HARQ) threads, etc. After receiving the configuration of the RRC, a terminal may perform PUSCH transmission on the configured time frequency resources immediately by using the configured transmission parameters.

PUSCH transmission based on CG type 2: a two-step resource alposition mode is adopted: first, the network RRC configures the transmission resources and transmission parameters including the period of the time domain resources, the times of repetition, the frequency hopping, the number of the HARQ processes, etc. and then the PUSCH based on the CG type 2 is activated by using a Configured Scheduling-Radio Network Temporary Identifier (CS-RNTI) scrambled Physical Downlink Control Channel (PDCCH), and simultaneously, other transmission resources and transmission parameters including the time domain resources, the frequency domain resources, the MCS, etc. are configured. When the receiving the parameters configured by the RRC, a terminal device cannot perform the PUSCH transmission by using the configured resources and parameters, and can perform the PUSCH transmission only after receiving corresponding PDCCH activation and configuring other resources and parameters.

Compared with a cellular network used by traditional New Radio (NR), a signal propagation delay between a terminal device and a satellite in the NTN is greatly increased. Large propagation delay will introduce very large scheduling delay for scheduling transmission, which results in large service transmission delay, and reduces the user experience. Meanwhile, since most of the time is spent on scheduling waiting, the resource utilization rate is reduced. Therefore, the NTN scenario is not very suitable for the scenario of scheduling transmission. For CG transmission, this also means that a PDCCH activation-based scheme of type 2 also introduces additional activation delay. The CG transmission of type 1 can reduce the transmission delay.

However, for an NTN scenario, the speed of the satellite relative to the ground is very high, which results in great changes in the signal propagation delay. Different propagation delay means that the channel quality also changes greatly, while the MCS of current type1 CG resources is statically configured, and only one MCS parameter is configured. In order to ensure that the terminal device can use CG transmission under various types of channel quality, conservative MCS level configuration, i.e. a lower MCS level, has to be used. Thus, the CG resources are not fully used when the channel quality is good, because good channel quality can carry higher MCS level transmission and transmit more service data.

In view of this, the embodiment of the disclosure will be described in detail in combination with a plurality of examples below.

Example 1

The measurement related information of the serving cell includes: a current measurement result of the serving cell.

That is, a plurality of MCS level parameters and correspondences between M measurement result quantification intervals and the N MCS levels are configured for an uplink transmission, and the terminal device determines which MCS level is used for performing the uplink transmission according to a currently measured serving cell measurement result. Both M and N are integers greater than or equal to 2.

The M measurement result quantization intervals may be in one-to-one correspondence with the N MCS levels, that is, M may be equal to N.

Or, the M measurement result quantization intervals may not correspond to with the N MCS levels, that is, M may not be equal to N. For example, there are three measurement result quantization intervals and two MCS levels. Measurement result quantization intervals 1 and 2 correspond to MCS level 1, and measurement result quantization interval 3 corresponds to MCS level 3.

In the example, the uplink transmission may be the transmission performed by the CG resources.

The current measurement result of the serving cell includes at least one of:

a current signal quality measurement result;

a current time advance (TA) value; and the current distance between the terminal device and a network device corresponding to the serving cell.

The signal quality measurement result may include at least one of a Channel State Information (CSI) measurement result, Reference Signal Receiving Power (RSRP), a Received Signal Strength Indicator (RSSI), Reference Signal Receiving Quality (RSRQ), and a Signal to Reference Ratio (SINR). These measurement results may be obtained by measuring a reference signal sent by the network device, which will not be described in detail here.

A method for obtaining the current TA value may include that: the terminal device determines a latest TA value according to self position information and ephemeris information, or called the current TA value.

A method for obtaining the current distance between the terminal device and the network device corresponding to the serving cell may be that: the terminal device may determine the self position information, then the current position of the network device may be determined according to the ephemeris information, and the current distance between the terminal device and the network device is determined on the basis of the positions of the terminal device and the network device.

The position information of the terminal device may be geographic position information corresponding to the position where the terminal device is located currently, for example, the longitude and the latitude (which may further the height), or may be a cell identifier corresponding to the position where the terminal is located, which will not be exhaustive in the embodiment. The position information by the terminal device may be obtained through a GPS unit installed thereon, or may be sent for the terminal device by the network device. Of course, there are also other modes, which will not be exhaustive in the embodiment.

The method may further include that: the terminal device determines the corresponding first MCS level from the N MCS levels according to the current measurement result of the serving cell and correspondences between M measurement result quantification intervals and the N MCS levels. M is an integer greater than or equal to 2.

The M measurement result quantization intervals are determined according to M−1 measurement result threshold values.

Specifically, the method may also include that: the network device sends configuration information to the terminal device. Correspondingly, the terminal device receives the configuration information sent from the network device.

The configuration information may include the following contents:

M−1 measurement result threshold values, and N MCS levels (or N sets of MCS level parameters).

In addition, the M−1 measurement result threshold values may also not be values configured by the network device, or predicted values, or values determined by the terminal device. Respectively speaking, the M−1 measurement result threshold values may be predicted, for example, may be predicted according to a protocol. That is, M−1 measurement result threshold values are predicted on both sides of the terminal device and the network device. Or, the M−1 measurement result threshold values are determined by the terminal device itself.

The M−1 measurement result threshold values may include: at least one threshold value for a signal quality measurement result, and/or, at least one quantization threshold value for the TA value, and/or, at least one threshold value for the distance.

Correspondingly, the measurement result quantization intervals include at least one of:
a CSI measurement result quantization interval;
a TA value quantization interval; and
a quantization interval of the distance between the terminal device and the network device.

Further, there is no overlap between different measurement result quantization intervals.

A measurement result quantization interval may be one of the above three, or a combination of two or three of the above three.

In the example, the correspondences between the M measurement result quantization intervals and the N MCS levels are configured by the network device, or are predicted, or are determined by the terminal device.

Respectively speaking, if the corresponding relationship is configured by the network device, then the configuration information of the abovementioned network device to the terminal device may also include the correspondences between the M measurement result quantization intervals and the N MCS levels. The configuration information may be carried by the RRC, or carried by a Medium Access Control Control Element (MAC CE), or carried by the PDCCH, or carried by the PDSCH, or the like, which will not be exhaustive here.

The correspondences between the M measurement result quantization intervals and the N MCS levels may be preset, which may be understood as being preset according to a protocol.

The correspondences between the M measurement result quantization intervals and the N MCS levels may also be determined by the terminal device, in this case, may be implicitly determined by the terminal device. That is to say, the terminal device may acquire the MCS parameters corresponding to M MCS levels and may also acquire the M−1 measurement result quantization interval threshold values. The terminal device may set correspondences between the M measurement result quantification intervals and the N MCS levels according to at least one of the following rules.

The interval with a larger signal quality measurement result corresponds to a higher MCS level.

The interval with a smaller TA value corresponds to a higher MCS level.

The interval with smaller distance between the terminal device and the network device (such as a satellite and a base station) of the serving cell corresponds to a higher MCS level.

In an example, M may be equal to N. That is to say, the M measurement result quantization intervals may be in one-to-one correspondence with the N MCS levels, that is, M may be equal to N.

Or, in an example, M may not be equal to N, that is, M measurement result quantization intervals may not correspond to with the N MCS levels, that is, M may not be equal to N. For example, there are three measurement result quantization intervals and two MCS levels. Measurement result quantization intervals 1 and 2 correspond to MCS level 1, and measurement result quantization interval 3 corresponds to MCS level 3.

Figure 4:
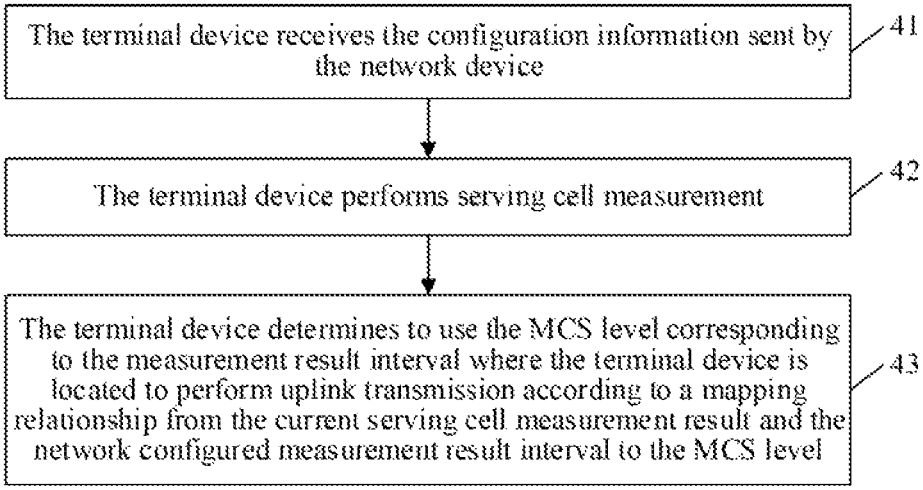
FIG. 4 is a third schematic flowchart of a data transmission method provided by an embodiment of the disclosure.

The scheme provided by the example is described in combination with FIG. 4.

At S41, the terminal device receives the configuration information sent by the network device.

The configuration information may be carried by RRC signaling.

Specifically, the following configured Grant (CG) Config information may be configured:
1) the CS-RNTI, which is the number of uplink HARQ threads reserved for CG, a period of CG resources, time-frequency resources, etc.;
2) N sets of MCS level parameters, herein N is greater than 1;
3) N−1 serving cell measurement result threshold values, herein the N−1 serving cell measurement result threshold values are configured to determine N serving cell measurement result intervals; and
4) the corresponding relationship between N serving cell measurement result intervals and the N MCS levels. The N serving cell measurement result intervals are in one-to-one correspondence with the N MCS levels. The serving cell measurement result intervals are used for serving cell measurement results when the current CG resources are sent on a terminal device side. The serving cell measurement result intervals include:
a CSI measurement result quantization interval, or
a TA value quantization interval, or a quantization interval of distance between the terminal device and the network device.

It is to be understood that the abovementioned serving cell measurement result interval may be one of the above, or two or three of the above.

Or, the one-to-one correspondence between the N serving cell measurement result intervals and the N MCS levels is determined implicitly, which may be determined by the terminal device here. For example:

An interval with a larger CSI corresponds to a higher MCS level; or an interval with a smaller TA value corresponds to a higher MCS level; or an interval with a smaller distance between the terminal device and a satellite base station corresponds to a higher MCS level.

At S42, the terminal device performs serving cell measurement.

The serving cell measurement may include: performing signal quality measurement, such as performing CSI measurement to obtain RSRP, which has been described previously in the present embodiment and will not be elaborated here; and/or, calculating, by the terminal device with positioning capacity, the distance between the terminal device and the satellite base station according to the position itself and the ephemeris information of the satellite; and/or, performing TA calculation, such as determining the position of the satellite according to the position itself and the ephemeris information of the satellite, so as to perform the TA calculation.

At S43, the terminal device determines to use the MCS level corresponding to the measurement result interval where the terminal device is located to perform uplink transmission according to a mapping relationship from the current serving cell measurement result and the network configured measurement result interval to the MCS level.

It is also to be pointed that, in the processing of the mapping relationship from the foregoing serving cell measurement result and the network configured measurement result interval to the MCS level, if the serving cell measurement result includes a plurality of items of content, such as the current TA value and a signal quality measurement result, then correspondingly, a second MCS level (for example, called MCS level A) may be obtained on the basis of the current TA value and the mapping relationship (or the corresponding relationship) from the corresponding measurement result interval to the MCS level; and a third MCS level (or called MCS level B) may be obtained on the basis of the signal quality measurement result and the mapping relationship (or the corresponding relationship) from the corresponding measurement result interval to the MCS level.

If MCS level A is different from MCS level B, then the MCS with the lowest level may be selected as a first MCS. If MCS level A is the same as MCS level B, then one of them is selected as the first MCS.

Or, if the forgoing three measurement results all exist, three MCS levels are obtained according to the mapping relationship (or the corresponding relationship) between the measurement result intervals and the MCS level respectively; if there are two same MCS levels, then the two same MCS levels are taken as the first MCS level; and if the three MCS levels are all different, the lowest MCS level is selected.

Or, the configuration information also includes: a default MCS level. Correspondingly, the default MCS level may be taken as the first MCS level in a case where the MCS levels obtained by matching on the basis of different measurement results and the mapping relationship (or the corresponding relationship) from the corresponding measurement result interval to the MCS level are different.

Figure 5:
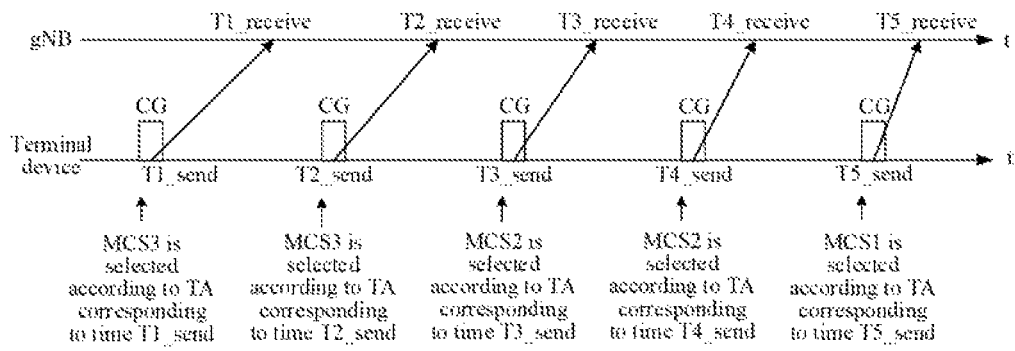
FIG. 5 is a first schematic diagram of a processing scenario provided by an embodiment of the disclosure.

The example is described in combination with FIG. 5. Taking the measurement result as the TA value as an example, it is assumed that the network device configures three sets of MCS parameters for the terminal device through the configuration information, herein MCS1 is greater than MCS2 greater than MCS3. Moreover, the measurement result quantization intervals corresponding to different MCSs are configured, that is, the corresponding TA intervals are configured for three MCSs respectively.

At time T1-send, MCS3 is selected according to the corresponding relationship and the TA value corresponding to the time. Correspondingly, the network device (satellite, which may be called gNB in the drawings) receives the information transmitted on the CG resources by using the MCS3 at time T1-receive.

The forgoing TA value may vary according to actual situations. Therefore, different TA values may be measured at different time, correspondingly, the MCS to be used at the time is determined according to the TA value corresponding to the time when uplink transmission needs to be performed on the CG resources. Similarly, combined with FIG. 5, the TA values at time T2-send and time T1-receive are the same, then the same MCS3 is obtained correspondingly, which will not be elaborated here. TA changes at time T3-send, MCS2 is selected according to the TA value corresponding to time T3-send, and then data transmission is performed on the CG resources by using MCS2. Correspondingly, the content or data transmitted on the CG resources by using the MCS2 is received at time T3-receive. The processing at times T4 and T5 are similar to the forgoing, which will not be elaborated here.

In the example, the most suitable MCS level may be selected according to different serving cell measurement results, so as to maximize the use of the channel quality to transmit as much data as possible. The terminal device only needs to select the MCS level through the current serving cell measurement result, so the scheme is simple and is easy to implement.

Example 2

The measurement related information of the serving cell includes: a current measurement result of the serving cell and the change trend of the measurement result of the serving cell.

That is, a plurality of MCS level parameters and a corresponding relationship between each MCS level and a plurality of serving cell measurement result quantification intervals are configured for one configuredGrantConfig. The terminal device determines which MCS level is used for performing CG transmission according to a currently measured serving cell measurement result and a future change trend of the measurement result.

The change trend of the measurement result of the serving cell is a predicted change trend relative to the current measurement result of the serving cell.

The acquisition and specific contents of the current measurement results of the serving cell are the same as those in example 1, which will not be elaborated here.

The change trend of the measurement result includes a first change trend, or a second change trend.

The first change trend includes at least one of: a TA value becomes smaller, a signal quality measurement result becomes greater, and the distance between the terminal device and the network device corresponding to the serving cell becomes shorter.

The second change trend includes at least one of: the TA value becomes greater, the signal quality measurement result becomes greater, and the distance between the terminal device and the network device corresponding to the serving cell becomes greater.

The abovementioned first change trend may be understood as that the measurement result becomes better, and the change trend may be understood as that the measurement result becomes worse.

Relevant descriptions of the contents included in the forgoing signal quality measurement result and the acquisition method are the same as those in example 1, which will not be elaborated here.

That is to say, the terminal device needs to acquire the future change trend of the signal quality measurement result. As for the future change trend, the future time may be determined according to the prediction of the time when the uplink transmission to be sent arrives at the network device.

The prediction of the time when the uplink transmission to be sent arrives at the network device may be the receiving time when the network device receives the uplink transmission (or the time when the uplink transmission arrives the network device) calculated through the information, such as the current position information of the terminal device, the movement trajectory of the terminal device, and the ephemeris information of the network device of the serving cell.

On this basis, the prediction of the TA value in the prediction of the change trend of the measurement result may be that: the TA value is assumed to be TA1 according to the current TA value corresponding to the current time n (or the TA value at a sending time of the uplink transmission); in a period of time in the future, that is, the time when the uplink transmission to be sent arrives at the network device is predicted as time m, the TA value at the time m is predicted as TA2, and the change trend may be determined as the first change trend or the second change trend according to the difference between TA1 and TA2.

Or, the change of the signal quality measurement result may also be inferred from the change of the TA value, for example, the TA value becomes smaller and the signal quality measurement result becomes greater.

Or, the distance between the current terminal device and the network device may also be obtained according to the position of the current terminal device and the current network device (satellite) determined on the basis of satellite ephemeris. Then, the predicted position of the terminal device and the predicted position of the satellite in a period of time in the future (that is, the time when the uplink transmission arrives at the network device) are predicted according to the position and the movement trajectory of the terminal device and the movement trajectory of the satellite, and the predicted distance between the terminal device and the satellite is calculated according to the predicted position of the terminal device and the predicted position of the satellite. The change trend of the measurement result is determined as the first change trend or the second change trend (that is, the change trend of the measurement result is determined as becoming better or becoming worse) on the basis of the predicted distance and the distance between the current terminal device and the network device.

Correspondingly, the terminal device determines which MCS level is used for performing uplink transmission according to a currently measured serving cell measurement result and the future change trend of the measurement result. Specifically speaking, the method further includes the following operations.

If the change trend of the measurement result of the serving cell is the first change trend, the corresponding first MCS level is determined from the N MCS levels according to the current measurement result of the serving cell and correspondences between the M measurement result quantification intervals and the N MCS levels; and M is an integer greater than or equal to 2

That is to say, if it is determined that the measurement result will become better in a period of time in the future on the basis of the change trend of the measurement result of the serving cell, then the first MCS is determined according to the measurement result of the current serving cell. Since the predicted signal quality in the future will not be worse than that at present, the currently selected first MCS can meet a future communication environment. Therefore, the first MCS selected in this mode can meet the communication requirements at present or in a period of time in the future.

Or,
if the change trend of the measurement result of the serving cell is the second change trend, a default MCS level is taken as the first MCS level.

That is to say, if it is determined that the measurement result will become worse in a period of time in the future on the basis of the change trend of the measurement result of the serving cell, then the default MCS level is directly taken as the first MCS level. At this moment, the default MCS level may be considered as the lowest MCS level. Since the predicted signal quality in the future will not be worse than that at present, the MCS level selected according to the current measurement result may not meet the future communication environment. Therefore, the lowest level or the default MCS level is directly used for performing uplink transmission, so as to ensure normal communication at present or in a period of time in the future.

In the example, a method for determining the M measurement result quantization intervals, a method for configuring or determining M−1 measurement result threshold values, and a method for acquisition N MCS levels are the same as those in example 1, which will not be elaborated here. Similarly, in the example, M may be equal to N, or M may not be equal to N, which have the same explanation as that in example 1, and will not be elaborated here.

It is to be pointed out in the example that the configuration information sent by the network device to the terminal device further includes a default MCS level. Or, it is understood that the configuration information includes a default MCS level parameter.

In addition, the default MCS level may also be acquired by other methods in addition to network device configuration. For example, the default MCS level may be preset according to a protocol.

Or, the lowest MCS level may be selected from a plurality of MCS levels as the default MCS level by the terminal device.

Figure 6:
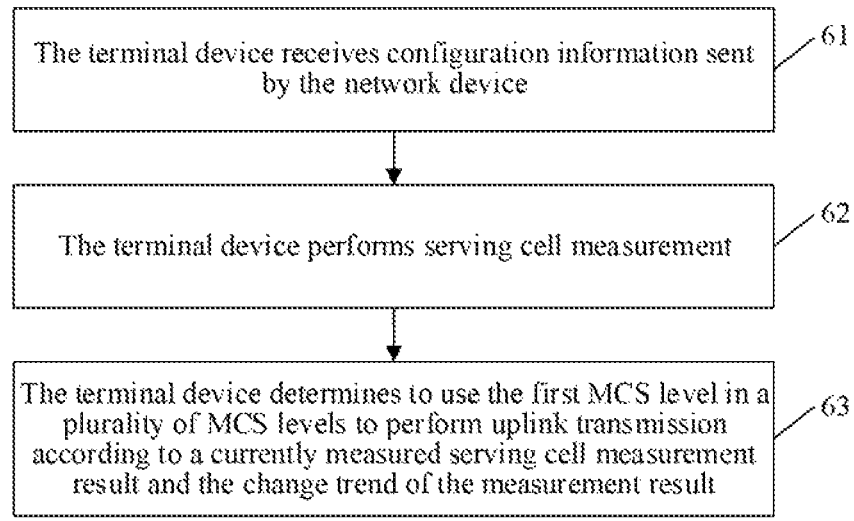
FIG. 6 is a fourth schematic flowchart of a data transmission method provided by an embodiment of the disclosure.

As shown in FIG. 6, an implementation process of the example is as follows.

At S61, the terminal device receives configuration information sent by the network device.

For example, the terminal device receives RRC configuration information, and configures the following configuredGrantConfig:

1) the CS-RNTI, which is the number of uplink HARQ processes reserved for CG, a period of CG resources, time-frequency resources, etc.;

2) N sets of MCS level parameters;
3) a default MCS level, here, it may be understood that an MCS level parameter may be configured as a default MCS level; or, the one of the N sets of MCS level parameters is indicated as a default MCS level for the network device; or, the configuration information may not include the field; the default MCS level is determined by the network device and the terminal on the basis of a default mode, for example, the smallest one of the N sets of MCS level parameters is taken as the default MCS level, or the one with the smallest number of the N sets of MCS level parameters is taken as the default level, which will not be exhaustive any longer;
4) N−1 serving cell measurement result threshold values, herein the N−1 serving cell measurement result threshold values are configured to determine N serving cell measurement result intervals; and
5) the corresponding relationship between N serving cell measurement result intervals and the N MCS levels. The N serving cell measurement result threshold values are in one-to-one correspondence with the N MCS levels. The serving cell measurement result intervals are used for the serving cell measurement results when the current CG resources are received on a network side.

Here, the serving cell measurement result intervals include at least one of:
a CSI measurement result quantization interval, or a TA value quantization interval, or a quantization interval of the distance between the terminal device and the network device.

Or, the one-to-one correspondence between the N serving cell measurement result intervals and the N MCS levels is determined implicitly. For example:
the interval with a larger CSI corresponds to a higher MCS level, or,
the interval with a smaller TA value corresponds to a higher MCS level, or
the interval with smaller distance between the terminal device and the satellite base station corresponds to a higher MCS level.

At S62, the terminal device performs serving cell measurement.

Specifically speaking, the serving cell measurement may include at least one of performing CSI measurement (of course, may be other measurements, as long as the signal quality measurement result can be obtained), and calculating, by the terminal device with positioning capacity, the distance between the terminal device and the satellite base station according to the position itself and the ephemeris information of the satellite; and performing TA calculation.

A specific measurement method has been described in the forgoing example, which will not be elaborated here.

At S63, the terminal device determines to use the first MCS level in a plurality of MCS levels to perform uplink transmission according to a currently measured serving cell measurement result and the change trend of the measurement result.

Specifically, the terminal device determines which MCS level is used for performing CG transmission according to a currently measured serving cell measurement result and a future change trend of the measurement result.

The description of the future change trend of the measurement result has been described in detail above in the example, which will not be elaborated here.

In the step, if the terminal device determines that the future serving cell measurement result will become better (that is, the measurement result is the first change trend), then the terminal device determines to use the MCS level corresponding to the measurement result interval where the terminal device is located to perform CG transmission according to a mapping relationship from the current serving cell measurement result and the network configured measurement result interval to the MCS level.

Otherwise, if the terminal device determines that the future serving cell measurement result will become worse (that is, the measurement result is the second change trend), then the terminal device uses a configured MCS default value to perform the CG transmission.

In an example, the case that the serving cell measurement result becomes better (the case that the serving cell measurement result becomes worse is opposite) includes at least one of: the TA value becomes smaller; the CSI measurement value becomes greater; and the distance from the terminal device to the satellite becomes smaller.

Figure 7:
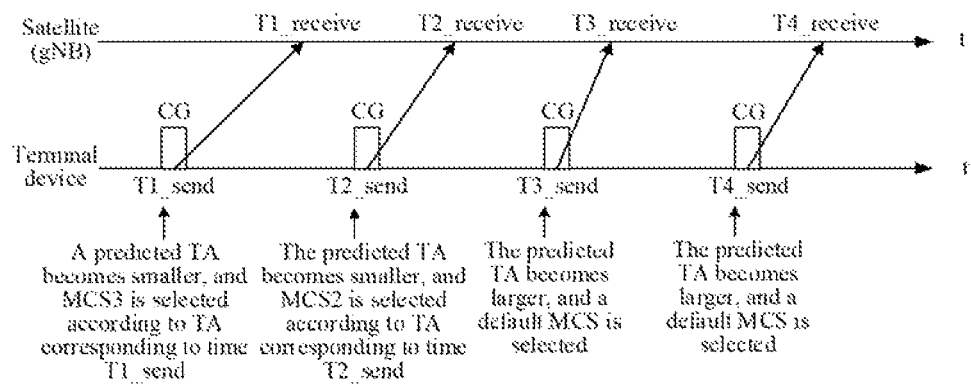
FIG. 7 is a second schematic diagram of a processing scenario according to an embodiment of the disclosure.

In combination with FIG. 7, the example provides a schematic description. Taking the change trend of the TA value as the change trend of the measurement result as an example, the network device (satellite or gNB) configures three MCSs for the terminal device, herein MCS1 is greater than MCS2 greater than MCS3. In addition, the network device also configures a default MCS level, and TA intervals corresponding to three MCS levels.

As shown in FIG. 7, at time T1-send, if the predicted TA value becomes smaller (that is, the measurement result is the first change trend), then the first MCS level is selected as the MCS3 according to the TA value corresponding to the time T1-send. At time T2-send, if the predicted TA value becomes smaller, the first MCS level is selected as the MCS2 according to the TA value corresponding to the time T2-send and uplink transmission is performed on the CG resources. Correspondingly, the network device receives the uplink transmission at time T2-receive. At time T3-send, if the predicted TA value becomes greater, that is, the measurement result becomes worse (the second change trend), then the default MCS level is selected as the first MCS level, and the default MCS is used for performing transmission on the CG resources. The prediction and processing methods at time T4-send and time T3-send are the same, which will not be elaborated here.

In the example, the most fundamental channel quality that determines the uplink transmission receiving quality is actually the serving cell measurement result when the uplink transmission is received at a network device side. If the future change trend of the serving cell measurement result becomes better, then the MCS level corresponding to the current measurement result is suitable for the CG receiving time. If the future change trend becomes worse, then the configured low MCS default level is relative secure. The terminal device only needs to predict the change trend, does not need to predict a specific value, which is easy to implement.

Example 3

The measurement related information of the serving cell includes: a predicted measurement result of the serving cell at a first time, herein the first time is a predicted time when the data of the uplink transmission is received in the serving cell.

That is, a plurality of MCS level parameters and a corresponding relationship between each MCS level and a plurality of serving cell measurement result quantification intervals are configured for one configuredGrantConfig. The terminal device predicts the serving cell measurement result when the CG is received and determines which MCS level is used for performing the uplink transmission (CG transmission).

The method further includes that: the terminal device determines the corresponding first MCS level from the N MCS levels according to the predicted measurement result of the serving cell at the first time and correspondences between M measurement result quantification intervals and the N MCS levels; and M is an integer greater than or equal to 2.

In the example, a method for determining the M measurement result quantization intervals, a method for configuring or determining M−1 measurement result threshold values, and a method for acquisition N MCS levels are the same as those in example 1, which will not be elaborated here. Similarly, in the example, M may be equal to N, or M may not be equal to N, which have the same explanation as that in example 1, and will not be elaborated here.

Different from example 1, the MCS is not determined by using the measurement result of the current serving cell in the example, but the MCS level is selected by predicting the measurement result of the serving cell at the first time.

In the example, the method for predicting the measurement result of the serving cell at the first time may include the following operation.

The terminal device predicts the predicted measurement result of the serving cell at the first time according to position information, a movement trajectory, and ephemeris information of the network device.

The predicted measurement result of the serving cell at the first time includes:
  a predicted signal quality measurement result of the serving cell at the first time;
  a predicted TA value of the serving cell at the first time; and
  the predicted distance between the terminal device and the network device corresponding to the serving cell at the first time.

The first time may be considered as the predicted time when this uplink transmission is received on the network side, or may be understood as the time when this uplink transmission arrives at the network device.

A method for obtaining the predicted TA value of the serving cell at the first time may be that: the terminal device calculates the time when the network device receives the uplink transmission according to ephemeris information, and calculates the TA value between the terminal device and the network device by using the position of the network device at this time and the predicted position of the terminal device.

The predicted TA value may also be obtained by another method of determining according to a preset adjustment value. For example, the current TA value may correspond to a preset adjustment value range and a time length corresponding to an adjustment value. The predicted TA value is calculated on the basis to the predicted time when the uplink transmission arrives at the network device and on the basis of the time difference value between the time and the current time and the forgoing determined adjustment value, that is, Δ is added to the current TA value (adjustment value).

A method for obtaining the predicted distance between the terminal device and the network device corresponding to serving cell at the first time may include the following operations.

The predicted position of the terminal device at the first time is calculated according to the current position of the terminal device and the movement trajectory. The predicted position of the network device at the first time is calculated according to the ephemeris information of the satellite. The predicted distance between the terminal device and the network device may be determined on the basis of the two predicted positions.

A method for predicting a predicted signal quality measurement result of the serving cell at the first time may include the following operation.

The terminal device determines a first proportion relationship according to the distance between the terminal device and the network device corresponding to the serving cell at an uplink transmission sending time and the distance between the terminal device and the network device corresponding to the serving cell at the first time.

The terminal device calculates a predicted signal quality measurement result of the serving cell at the first time according to the first proportion relationship and the CSI measurement result at the uplink transmission sending time.

The first proportion relationship may be an inverse ratio of a ratio of the distance between the terminal device and the network device corresponding to the serving cell at an uplink transmission sending time to the distance between the terminal device and the network device corresponding to the serving cell at the first time.

Or, the first proportion relationship may be an inverse ratio of a ratio of a square value of the distance between the terminal device and the network device corresponding to the serving cell at an uplink transmission sending time to a square value of the distance between the terminal device and the network device corresponding to the serving cell at the first time.

Figure 8:
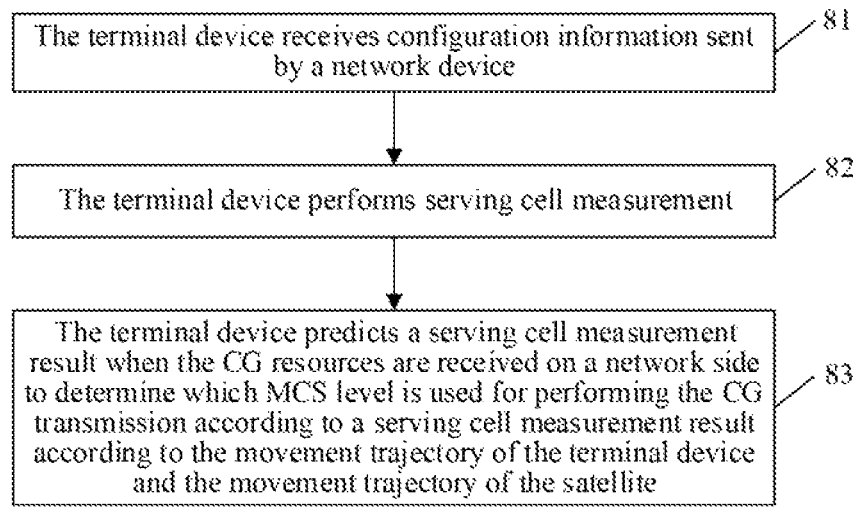
FIG. 8 is a fifth schematic flowchart of a data transmission method provided by an embodiment of the disclosure.

As shown in FIG. 8, a specific implementation process of the example may include the following step.

At S81, a terminal device receives configuration information sent by a network device.

It may be that the terminal device receives RRC configuration information, and configures the following configuredGrantConfig, which includes:
  1) the CS-RNTI, which is the number of uplink HARQ processes reserved for CG, a period of CG resources, time-frequency resources, etc.;
  2) N sets of MCS level parameters;
  3) N−1 serving cell measurement result threshold values, herein the N−1 serving cell measurement result threshold values are configured to determine N serving cell measurement result intervals; and
  4) the corresponding relationship between N serving cell measurement result intervals and the N MCS levels. N serving cell measurement result intervals are in one-to-one correspondence with the N MCS levels. The serving cell measurement result intervals are used for serving cell measurement results when the current CG resources are received on a network side. The serving cell measurement result intervals include: a CSI measurement result quantization interval, or a TA value quantization interval, or a quantization interval of the distance between the terminal device and the network device.

Or, the one-to-one correspondence between the N serving cell measurement result intervals and the N MCS levels is determined implicitly. For example: an interval with a larger CST corresponds to a higher MCS level; or an interval with a smaller TA value corresponds to a higher MCS level; or an interval with a smaller distance between the terminal device and a satellite base station corresponds to a higher MCS level.

At S82, the terminal device performs serving cell measurement, which includes at least one of the following. CSI measurement: the terminal device with positioning capacity calculates the distance between the terminal device and the satellite base station according to the position itself and the ephemeris information of the satellite; and TA calculation.

At S83, the terminal device predicts a serving cell measurement result when the CG resources are received on a network side to determine which MCS level is used for performing the CG transmission according to a serving cell measurement result according to the movement trajectory of the terminal device and the movement trajectory of the satellite.

An example of predicting the serving cell measurement result may include the following operations.

The terminal device calculates the time when the CG transmission is received on the network side according to the ephemeris information, and calculates the distance between the terminal device and the satellite base station by using the position of the satellite at this time and the predicted position of the terminal device.

The terminal device calculates the time when the CG transmission is received on the network side according to the ephemeris information, and calculates a TA between the terminal device and the satellite base station by using the position of the satellite at this time and the predicted position of the terminal device.

The terminal device perform equal scaling, according to the CG sending time and the predicted distance between the terminal device and the satellite base station at the CG receiving time, on the CSI measurement value at a sending time as the predicted CSI measurement value at the CG receiving time. The equal scaling may be in inverse proportion to the square of the distance.

Figure 9:
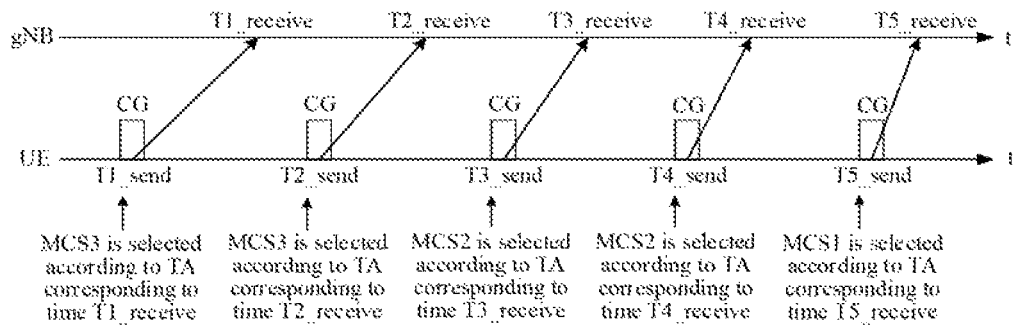
FIG. 9 is a third schematic diagram of a processing scenario provided by an embodiment of the disclosure.

An implementation scenario of the example is described in combination with FIG. 9. It is assumed that the network device configures three MCS levels for the terminal device through the configuration information, and MCS1 is greater than MCS2 greater than MCS3.

At time T1-send, MCS3 is selected according to the predicted TA value corresponding to the time T1-receive, uplink transmission is performed on the basis of the MCS3, and the processing at time T2-send is similar thereto. At time T3-send, the MCS2 is selected according to the predicted TA value corresponding to the time T3-receive, and so on, which will not be elaborated here.

In the example, the most fundamental channel quality that determines the CG transmission receiving quality is actually the serving cell measurement result when the CG is received. The terminal device predicts that the serving cell measurement result when the CG is received is closer to the most real receiving channel condition according to the ephemeris information, so as to realizes more accurate selection and use of the MCS level.

It can be seen that, by using the abovementioned scheme, the most suitable first MCS level can be selected according to different serving cell measurement results of the terminal device, and then the uplink transmission is performed by using the first MCS level. Thus, the use of a channel can be maximized to transmit as much data as possible can be transmitted in quality of the channel, and the processing efficiency of a system is ensured.

Figure 10:
FIG. 10 is a schematic structural diagram of configuration of a terminal device provided by an embodiment of the disclosure.

An embodiment of the disclosure provides a terminal device, as shown in FIG. 10, including: a first communication unit 91.

The first communication unit 91 is configured to perform uplink transmission by using a first MCS level.

Figure 11:
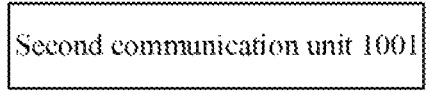
FIG. 11 is a schematic structural diagram of configuration of a network device provided by an embodiment of the disclosure.

The first MCS level is one of MCS levels determined from N MCS levels according to the measurement related information of the serving cell of the terminal device, and N is an integer greater than or equal to 2.

correspondingly, an embodiment of the disclosure further provides a network device, as shown in FIG. 11, including: a second communication unit 1001.

The second communication unit 1001 is configured to receive the uplink transmission transmitted by using a first MCS level.

The first MCS level is one of N MCS levels, and N is an integer greater than or equal to 2.

In the embodiment, the uplink transmission may be the transmission performed on the CG resources. The network device may be a satellite in an NTN scenario.

The embodiment of the disclosure will be described in detail in combination with a plurality of examples below.

Example 1

The measurement related information of the serving cell includes: a current measurement result of the serving cell.

That is, a plurality of MCS level parameters and correspondences between M measurement result quantification intervals and the N MCS levels are configured for an uplink transmission, the terminal device determines which MCS level is used for performing the uplink transmission according to a currently measured serving cell measurement result. Both M and N are integers greater than or equal to 2.

The M measurement result quantization intervals may be in one-to-one correspondence with the N MCS levels, that is, M may be equal to N. Or, the M measurement result quantization intervals may not correspond to with the N MCS levels, that is, M may not be equal to N.

In the example, the uplink transmission may be the transmission performed by the CG resources.

The current measurement result of the serving cell includes at least one of:

a current signal quality measurement result;
a current TA value; and
the current distance between the terminal device and a network device corresponding to the serving cell.

The signal quality measurement result may include at least one of a CSI measurement result, RSRP, an RSSI, RSRQ, and a SINR. These measurement results may be obtained by measuring a reference signal sent by the network device, which will not be described in detail here.

The method may further include: a first processing unit 92 which is configured to determine the corresponding first MCS level from the N MCS levels according to the current measurement result of the serving cell and correspondences between M measurement result quantification intervals and the N MCS levels. M is an integer greater than or equal to 2.

The M measurement result quantization intervals are determined according to M−1 measurement result threshold values.

Specifically, the method may further include that: the second communications unit 1001 of the network device sends configuration information to the terminal device. Correspondingly, the first communications unit 91 of the terminal device receives the configuration information sent from the network device.

The configuration information may include the following contents:

M−1 measurement result threshold values, and N MCS levels (or N sets of MCS level parameters).

In addition, the M−1 measurement result threshold values may also not be values configured by the network device, or predicted values, or values determined by the terminal device. Respectively speaking, the M−1 measurement result threshold values may be predicted, for example, may be predicted according to a protocol. That is, M−1 measurement result threshold values are predicted on both sides of the terminal device and the network device. Or, the M−1 measurement result threshold values are determined by the terminal device itself.

The M−1 measurement result threshold values may include: at least one threshold value for a signal quality measurement result, and/or, at least one quantization threshold value for the TA value, and/or, at least one threshold value for the distance.

Correspondingly, the measurement result quantization intervals include at least one of:
- a CSI measurement result quantization interval;
- a TA value quantization interval; and
- a quantization interval of the distance between the terminal device and the network device.

Further, there is no overlap between different measurement result quantization intervals.

A measurement result quantization interval may be one of the above three, or a combination of two or three of the above three.

In the example, the correspondences between the M measurement result quantization intervals and the N MCS levels are configured by the network device, or are predicted, or are determined by the terminal device.

Respectively speaking, if the corresponding relationship is configured by the network device, then the configuration information of the abovementioned network device to the terminal device may also include the correspondences between the M measurement result quantization intervals and the N MCS levels. The configuration information may be carried by the RRC, or carried by a MAC CE), or carried by a PDCCH, or carried by a PDSCH, or the like, which will not be exhaustive here.

The correspondences between the M measurement result quantization intervals and the N MCS levels may be preset, which may be understood as being preset according to a protocol.

The correspondences between the M measurement result quantization intervals and the N MCS levels may also be determined by the terminal device, in this case, may be implicitly determined by the terminal device. That is to say, the terminal device may acquire the MCS parameters corresponding to M MCS levels and may also acquire the M−1 measurement result quantization interval threshold values. The terminal device may set correspondences between the M measurement result quantification intervals and the N MCS levels according to at least one of the following rules.

The interval with a larger signal quality measurement result corresponds to a higher MCS level.

The interval with a smaller TA value corresponds to a higher MCS level.

The interval with smaller distance between the terminal device and the network device (such as a satellite and a base station) of the serving cell corresponds to a higher MCS level.

In the example, the most suitable MCS level may be selected according to different serving cell measurement results, so as to maximize the use of the channel quality to transmit as much data as possible. The terminal device only needs to select the MCS level through the current serving cell measurement result, so the scheme is simple and is easy to implement.

Example 2

The measurement related information of the serving cell includes: a current measurement result of the serving cell and the change trend of the measurement result of the serving cell.

That is, a plurality MCS level parameters and a corresponding relationship between each MCS level and a plurality of serving cell measurement result quantification intervals are configured for one configuredGrantConfig. The terminal device determines which MCS level is used for performing CG transmission according to a currently measured serving cell measurement result and a future change trend of the measurement result.

The change trend of the measurement result of the serving cell is a predicted change trend relative to the current measurement result of the serving cell.

The acquisition and specific contents of the current measurement results of the serving cell are the same as those in example 1, which will not be elaborated here.

The change trend of the measurement result includes a first change trend, or a second change trend.

The first change trend includes at least one of: a TA value becomes smaller, a signal quality measurement result becomes greater, and the distance between the terminal device and the network device corresponding to the serving cell becomes shorter.

The second change trend includes at least one of: the TA value becomes greater, the signal quality measurement result becomes greater, and the distance between the terminal device and the network device corresponding to the serving cell becomes greater.

The abovementioned first change trend may be understood as that the measurement result becomes better, and the change trend may be understood as that the measurement result becomes worse.

Relevant descriptions of the contents included in the forgoing signal quality measurement result and the acquisition method are the same as those in example 1, which will not be elaborated here.

That is to say, the terminal device needs to acquire the future change trend of the signal quality measurement result. As for the future change trend, the future time may be determined according to the prediction of the time when the uplink transmission to be sent arrives at the network device.

The prediction of the time when the uplink transmission to be sent arrives at the network device may be the receiving time when the network device receives the uplink transmission (or the time when the uplink transmission arrives the network device) calculated through the information, such as the current position information of the terminal device, the movement trajectory of the terminal device, and the ephemeris information of the network device of the serving cell.

On this basis, the prediction of the TA value in the prediction of the change trend of the measurement result may be that: the first processing unit 92 assumes that the TA value is TA1 according to the current TA value corresponding to the current time n (or the TA value at a sending time of the uplink transmission): in a period of time in the future, that is, the time when the uplink transmission to be sent arrives at the network device is predicted as time m, the TA value at the time m is predicted as TA2, and the change trend may be determined as the first change trend or the second change trend according to the difference between TA1 and TA2.

Or, the change of the signal quality measurement result may also be inferred from the change of the TA value, for example, the TA value becomes smaller and the signal quality measurement result becomes greater.

Or, the first processing unit 92 may also be configured to: obtain the distance between the current terminal device and the network device according to the position of the current terminal device and the current network device (satellite) determined on the basis of satellite ephemeris; then, predict the predicted position of the terminal device and the predicted position of the satellite in a period of time in the future (that is, the time when the uplink transmission arrives at the network device) according to the position and the movement trajectory of the terminal device and the movement trajectory of the satellite, and calculate the predicted distance between the terminal device and the satellite according to the predicted position of the terminal device and the predicted position of the satellite; and determine the change trend of the measurement result as the first change trend or the second change trend (that is, the change trend of the measurement result is determined as becoming better or becoming worse) on the basis of the predicted distance and the distance between the current terminal device and the network device.

Correspondingly, the first processing unit 92 of the terminal device determines which MCS level is used for performing uplink transmission according to a currently measured serving cell measurement result and the future change trend of the measurement result. Specifically speaking, the first processing unit 92 is configured to: if the change trend of the measurement result of the serving cell is the first change trend, determine the corresponding first MCS level from the N MCS levels according to the current measurement result of the serving cell and correspondences between the M measurement result quantification intervals and the N MCS levels; and M is an integer greater than or equal to 2;

That is to say, the first processing unit 92 is configured to: determine the first MCS according to the measurement result of the current serving cell if it is determined that the measurement result will become better in a period of time in the future on the basis of the change trend of the measurement result of the serving cell. Since the predicted signal quality in the future will not be worse than that at present, then the currently selected first MCS can meet a future communication environment. Therefore, the first MCS selected in this mode can meet the communication requirements at present or in a period of time in the future.

Or, the first processing unit 92 is configured to take a default MCS level as the first MCS level if the change trend of the measurement result of the serving cell is the second change trend.

That is to say, if it is determined that the measurement result will become worse in a period of time in the future on the basis of the change trend of the measurement result of the serving cell, then the default MCS level is directly taken as the first MCS level. At this moment, the default MCS level may be considered as the lowest MCS level. Since the predicted signal quality in the future will not be worse than that at present, then the MCS level selected according to the current measurement result may not meet the future communication environment. Therefore, the lowest level or the default MCS level is directly used for performing uplink transmission, so as to ensure normal communication at present or in a period of time in the future.

In the example, a method for determining the M measurement result quantization intervals, a method for configuring or determining M−1 measurement result threshold values, and a method for acquisition N MCS levels are the same as those in example 1, which will not be elaborated here.

It is to be pointed out in the example that the configuration information sent by the network device to the terminal device further includes a default MCS level. Or, it is understood that the configuration information includes a default MCS level parameter.

In addition, the default MCS level may also be acquired by other methods in addition to network device configuration. For example, the default MCS level may be preset according to a protocol.

Or, the lowest MCS level may be selected from a plurality of MCS levels as the default MCS level by the terminal device.

Example 3

The measurement related information of the serving cell includes: a predicted measurement result of the serving cell at a first time, herein the first time is a predicted time when the data of the uplink transmission is received in the serving cell.

That is, a plurality of MCS level parameters and a corresponding relationship between each MCS level and a plurality of serving cell measurement result quantification intervals are configured for one configuredGrantConfig. The terminal device predicts the serving cell measurement result when the CG is received and determines which MCS level is used for performing the uplink transmission (CG transmission).

The method further includes that: the terminal device determines the corresponding first MCS level from the N MCS levels according to the predicted measurement result of the serving cell at the first time and correspondences between M measurement result quantification intervals and the N MCS levels; and M is an integer greater than or equal to 2.

Different from example 1, the MCS is not determined by using the measurement result of the current serving cell in the example, but the MCS level is selected by predicting the measurement result of the serving cell at the first time.

In the example, the method for predicting the measurement result of the serving cell at the first time may include the following operation.

The first processing unit 92 is configured to predict the predicted measurement result of the serving cell at the first time according to position information, a movement trajectory, and ephemeris information of the network device.

The predicted measurement result of the serving cell at the first time includes:

a predicted signal quality measurement result of the serving cell at the first time;

a predicted TA value of the serving cell at the first time; and the predicted distance between the terminal device and the network device corresponding to the serving cell at the first time.

The first time may be considered as the predicted time when this uplink transmission is received on the network side, or may be understood as the time when this uplink transmission arrives at the network device.

A method for obtaining the predicted TA value of the serving cell at the first time may be that: the first processing unit 92 calculates the time when the network device receives the uplink transmission according to ephemeris information, and calculates the TA value between the terminal device and the network device by using the position of the network device at this time and the predicted position of the terminal device.

The predicted TA value may also be obtained by another method of determining according to a preset adjustment value. For example, the current TA value may correspond to a preset adjustment value range and a time length corresponding to an adjustment value. The predicted TA value is calculated on the basis to the predicted time when the uplink transmission arrives at the network device and on the basis of the time difference value between the time and the current time and the forgoing determined adjustment value, that is, A is added to the current TA value (adjustment value).

A method for obtaining the predicted distance between the terminal device and the network device corresponding to serving cell at the first time may include the following operations.

The first processing unit 92 calculates the predicted position of the terminal device at the first time according to the current position of the terminal device and the movement trajectory, may calculate to obtain the predicted position of the network device at the first time according to the ephemeris information of the satellite, and may determine the predicted distance between the terminal device and the network device on the basis of the two predicted positions.

A method for predicting a predicted signal quality measurement result of the serving cell at the first time may include the following operation.

The first processing unit 92 determines a first proportion relationship according to the distance between the terminal device and the network device corresponding to the serving cell at an uplink transmission sending time and the distance between the terminal device and the network device corresponding to the serving cell at the first time, and calculates a predicted signal quality measurement result of the serving cell at the first time according to the first proportion relationship and the CSI measurement result at the uplink transmission sending time.

The first proportion relationship may be an inverse ratio of a ratio of the distance between the terminal device and the network device corresponding to the serving cell at an uplink transmission sending time to the distance between the terminal device and the network device corresponding to the serving cell at the first time.

Or, the first proportion relationship may be an inverse ratio of a ratio of a square value of the distance between the terminal device and the network device corresponding to the serving cell at an uplink transmission sending time to a square value of the distance between the terminal device and the network device corresponding to the serving cell at the first time.

It can be seen that, by using the abovementioned scheme, the most suitable first MCS level can be selected according to different serving cell measurement results of the terminal device, and then the uplink transmission is performed by using the first MCS level. Thus, the use of a channel can be maximized, as much data as possible can be transmitted in combination with the quality of the channel, and the processing efficiency of the system is ensured.

Figure 12:
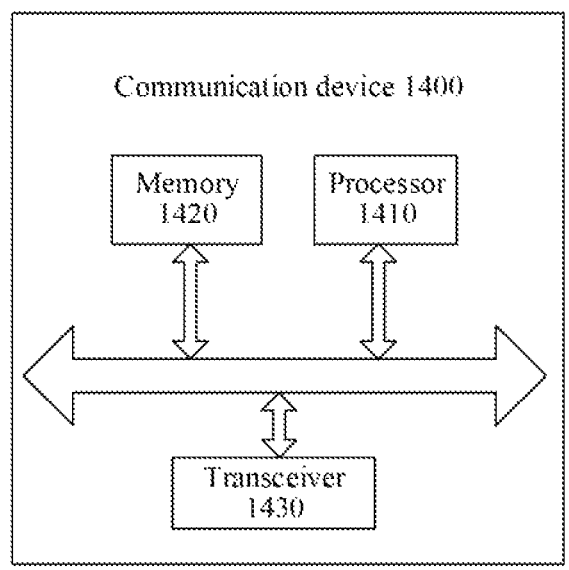
FIG. 12 is a schematic structural diagram of configuration of a communication device provided by an embodiment of the disclosure.

FIG. 12 is a schematic structural diagram of a communication device 1400 provided by an embodiment of the disclosure. The communication device in the embodiment may specifically be a terminal device or a network device in the forgoing embodiments. The communication device 1400 as shown in FIG. 12 includes a processor 1410. The processor 1410 may call and run a computer program from a memory to implement the method in the embodiment of the disclosure.

Optionally, as shown in FIG. 12, the communications device 1400 may further include a memory 1420. The processor 1410 may call and run the computer program from the memory 1420 to implement the method in the embodiment of the disclosure.

The memory 1420 may be independent of the processor 1410, or may be integrated into the processor 1410.

Optionally, as shown in FIG. 12, the communications device 1400 may also include a transceiver 1430. The processor 1410 may control the transceiver 1430 to be in communication with other devices, specifically, to send information or data to other devices, or receive the information or data sent by other devices.

The transceiver 1430 may include a transmitter and a receiver. The transceiver 1430 may further include an antenna. There may be one or more antennae.

Optionally, the communications device 1400 may specifically be a terminal device or network device of the embodiment of the disclosure to implement corresponding flows, which will not be elaborated here for simplicity.

Figure 13:
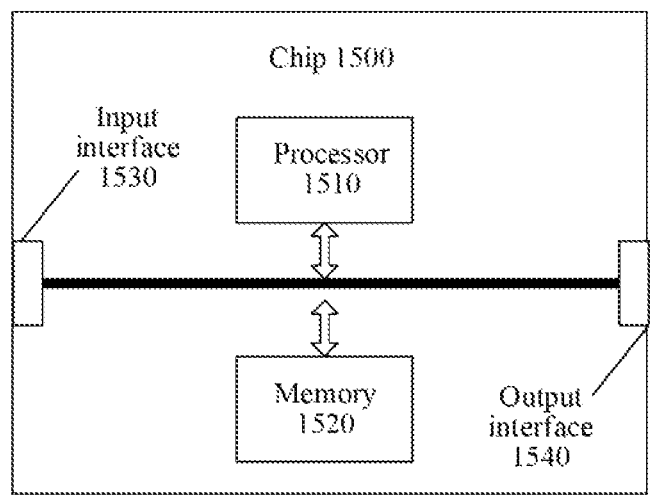
FIG. 13 is a schematic block diagram of a chip provided by an embodiment of the disclosure.

FIG. 13 is a schematic structure diagram of a chip according to an embodiment of the disclosure. The chip 1500 as shown in FIG. 13 includes a processor 1510. The processor 1510 may call and run a computer program from a memory to implement the method in the embodiment of the disclosure.

Optionally, as shown in FIG. 13, the chip 1500 may further include a memory 1520. The processor 1510 may call and run the computer program from the memory 1520 to implement the method in the embodiment of the disclosure.

The memory 1520 may be independent of the processor 1510, or may be integrated into the processor 1510.

Optionally, the chip 1500 may further include an input interface 1530. The processor 1510 may control the input interface 1530 to be in communication with other devices or chips, specifically, to acquire the information or data sent by other devices or chips.

Optionally, the chip 1500 may further include an output interface 1540. The processor 1510 may control the output interface 1540 to be in communication with other devices or chips, specifically, to output information or data sent to other devices or chips.

Optionally, the chip may be applied to the terminal device or the network device in the embodiments of the disclosure to implement corresponding flows, which will not be elaborated here for simplicity.

It should be understood that the chip mentioned in the embodiments of the disclosure may also be called a system-level chip, a system chip, a chip system, or a system on chip, etc.

It should be understood that the processor of the embodiments of the disclosure may be an integrated circuit chip with signal processing capacity. In an implementation process, each step of the abovementioned method embodiments may be completed by an integrated logic circuit of hardware in the processor or an instruction in the form of software. The abovementioned processor may be a general-purpose processor, a DSP, an ASIC, an FPGA, or other programmable logic devices, discrete gate or transistor logic devices, and discrete hardware components.

It may be understood that the memory in the embodiments of the present invention may be a volatile memory or a nonvolatile memory, or may include a volatile memory and a nonvolatile memory. It should be noted that the memory of the systems and methods described in this specification includes but is not limited to these and any other proper types of memories.

It should be understood that the abovementioned memories are exemplary but not restrictive, for example, the memory in the embodiments of the disclosure may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDRSDRAM), an enhanced synchronous dynamic random access memory (enhanced SDRAM, ESDRAM), a synchronous link dynamic random access memory (synch link DRAM, SLDRAM), and a direct rambus random access memory (Direct Rambus RAM, DRRAM). That is to say, the memories described in the embodiment of the disclosure are intended to include, but not limited to, these and any other suitable types of memories.

Figure 14:
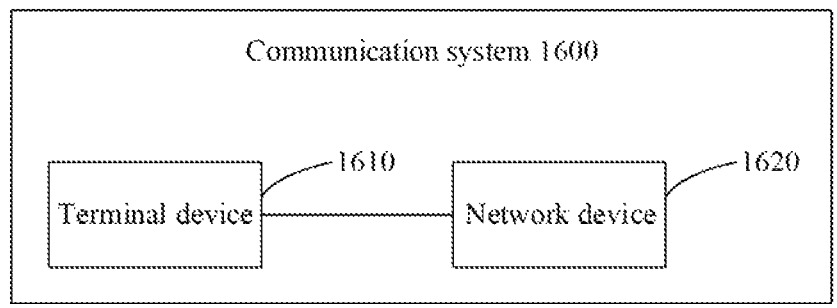
FIG. 14 is a second schematic diagram of a communication system architecture provided by an embodiment of the disclosure.

FIG. 14 is a schematic block diagram of a communication system 1600 provided by an embodiment of the disclosure. As shown in FIG. 14, the communications system 1600 includes a network device 1610 and a terminal 1620.

The network device 1610 may be configured to realize corresponding functions realized by the communication device in the abovementioned method, and the terminal 1620 may be configured to realize corresponding functions realized by a terminal in the abovementioned method, which will not be elaborated here for simplicity.

The embodiments of the disclosure further provide a computer-readable storage medium, which is configured to store a computer program.

Optionally, the computer-readable storage medium may be applied to a network device or a satellite or a terminal device in the embodiments of the disclosure. The computer program enables a computer to execute corresponding flows implemented by the network device in each method of the embodiments of the disclosure, which will not be elaborated here for simplicity.

The embodiments of the disclosure further provide a computer program product, which including a computer program instruction.

Optionally, the computer program product may be applied to a network device or a satellite or a terminal device in the embodiments of the disclosure. The computer program instruction enables a computer to execute corresponding flows implemented by the network device in each method of the embodiments of the disclosure, which will not be elaborated here for simplicity.

The embodiments of the disclosure further provide a computer program.

Optionally, the computer program may be applied to a network device or a satellite or a terminal device in the embodiments of the disclosure. The computer program runs in a computer to enable the computer to execute corresponding flows implemented by the network device in each method of the embodiments of the disclosure, which will not be elaborated here for simplicity.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in the disclosure, it should be understood that the disclosed system, apparatus, and method may be implemented in other modes. The units described as separate parts may or may not be physically separated, and parts displayed as units may or may not be physical units, and namely may be located in the same place, or may also be distributed to multiple network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The computer software product is stored in a storage medium, and includes a plurality of instructions for instructing a computer device (which may be a personal computer, a server, a network device, etc.) to execute all or part of the steps of the methods in various embodiments of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variation or replacement readily figured out by a person skilled in the art within the technical scope disclosed in the disclosure shall fall within the scope of the protection of the disclosure. Therefore, the scope of protection of the disclosure shall be subject to the scope of the protection of the claims.

The invention claimed is:

1. A data transmission method, comprising:
performing, by a terminal device, uplink transmission by using a first Modulation and Coding Scheme (MCS) level, wherein
the first MCS level is one of MCS levels determined from N MCS levels according to measurement related information of a serving cell of the terminal device, and N is an integer greater than or equal to 2;
wherein the measurement related information of the serving cell comprises:
a current measurement result of the serving cell;
wherein the current measurement result of the serving cell comprises at least one of:
a current signal quality measurement result;
a current time advance (TA) value; and a current distance between the terminal device and a network device corresponding to the serving cell;

wherein the method further comprises:
determining the first MCS level from the N MCS levels according to the current measurement result of the serving cell and correspondences between M measurement result quantization intervals and the N MCS levels, wherein M is an integer greater than or equal to 2.

2. The method of claim 1, wherein the M measurement result quantization intervals are determined according to M−1 measurement result threshold values; and
the M−1 measurement result threshold values are: values configured by the network device, or predicted values, or values determined by the terminal device.

3. The method of claim 2, wherein the measurement result quantization intervals comprise at least one of:
a signal quality measurement result quantization interval;
a TA value quantization interval; and
a quantization interval of the distance between the terminal device and the network device.

4. The method of claim 1, wherein the uplink transmission is the transmission performed on Configured Grant (CG) resources.

5. The method of claim 1, wherein the signal quality measurement result comprises at least one of:
a Channel State Information (CSI) measurement result,
Reference Signal Receiving Power (RSRP),
a Received Signal Strength Indicator (RSSI),
Reference Signal Receiving Quality (RSRQ), and
a Signal-to-Interference-plus-Noise Ratio (SINR).

6. The method of claim 1, wherein the measurement related information of the serving cell further comprises: a change trend of a measurement result of the serving cell.

7. The method of claim 6, wherein
the change trend of the measurement result of the serving cell is a predicted change trend relative to the current measurement result of the serving cell;
the change trend of the measurement result comprises a first change trend, or a second change trend;
the first change trend comprises at least one of: a TA value becomes smaller, a signal quality measurement result becomes greater, and a distance between the terminal device and the network device corresponding to the serving cell becomes shorter; and
the second change trend comprises at least one of: the TA value becomes greater, the signal quality measurement result becomes greater, and the distance between the terminal device and the network device corresponding to the serving cell becomes greater.

8. The method of claim 1, wherein
the measurement related information of the serving cell further comprises: a predicted measurement result of the serving cell at a first time; and
the first time is: a predicted time when data of the uplink transmission is received in the serving cell.

9. The method of claim 8, further comprising:
predicting, by the terminal device, the predicted measurement result of the serving cell at the first time according to position information and a movement trajectory, and ephemeris information of the network device.

10. A data transmission method, comprising:
receiving, by a network device, uplink transmission transmitted by using a first Modulation and Coding Scheme (MCS) level, wherein the first MCS level is one of N MCS levels according to measurement related information of a serving cell of a terminal device, and N is an integer greater than or equal to 2;
wherein the measurement related information of the serving cell comprises:
a current measurement result of the serving cell;
wherein the current measurement result of the serving cell comprises at least one of:
a current signal quality measurement result;
a current time advance (TA) value; and
a current distance between the terminal device and the network device corresponding to the serving cell;
wherein the first MCS level is determined from the N MCS levels according to a current measurement result of a serving cell and correspondences between M measurement result quantization intervals and the N MCS levels, wherein M is an integer greater than or equal to 2.

11. The method of claim 10, further comprising:
sending, by the network device, configuration information to the terminal device,
wherein the configuration information comprises:
M−1 measurement result threshold values, wherein the M−1 measurement result threshold values are configured to determine the M measurement result quantization intervals.

12. The method of claim 11, wherein the measurement result quantization intervals comprise at least one of:
a signal quality measurement result quantization interval;
a TA value quantization interval; and
a quantization interval of the distance between the terminal device and the network device.

13. The method of claim 11, wherein the configuration information further comprises:
the correspondences between the M measurement result quantization intervals and the N MCS levels.

14. The method of claim 11, wherein the configuration information further comprises N MCS levels.

15. The method of claim 11, wherein the configuration information further comprises a default MCS level.

16. A terminal device, comprising:
a transceiver, configured to perform uplink transmission by using a first Modulation and Coding Scheme (MCS) level, wherein
the first MCS level is one of the MCS levels determined from N MCS levels according to measurement related information of a serving cell of the terminal device, and N is an integer greater than or equal to 2;
wherein the measurement related information of the serving cell comprises: a current measurement result of the serving cell,
wherein the current measurement result of the serving cell comprises at least one of:
a current signal quality measurement result;
a current time advance (TA) value; and
a current distance between the terminal device and a network device corresponding to the serving cell;
wherein the terminal device further comprises:
a processor, configured to determine the first MCS level from the N MCS levels according to the current measurement result of the serving cell and correspondences between M measurement result quantization intervals and the N MCS levels, wherein M is an integer greater than or equal to 2.

17. The terminal device of claim 16, wherein the M measurement result quantization intervals are determined according to M−1 measurement result threshold values; and
the M−1 measurement result threshold values are: values configured by the network device, or predicted values, or values determined by the terminal device.

18. The terminal device of claim 17, wherein the measurement result quantization intervals comprise at least one of:
a signal quality measurement result quantization interval;
a TA value quantization interval; and
a quantization interval of the distance between the terminal device and the network device.

19. The terminal device of claim 16, wherein the uplink transmission is transmission performed on Configured Grant (CG) resources.

20. The terminal device of claim 16, wherein the signal quality measurement result comprises at least one of:
a Channel State Information (CSI) measurement result,
Reference Signal Receiving Power (RSRP),
a Received Signal Strength Indicator (RSSI),
Reference Signal Receiving Quality (RSRQ), and
a Signal-to-Interference-plus-Noise Ratio (SINR).

\* \* \* \* \*